Oct. 28, 1930.  E. O. H. POEPPEL  1,779,712
PIPE NIPPLE CONNECTION
Filed Nov. 11, 1926
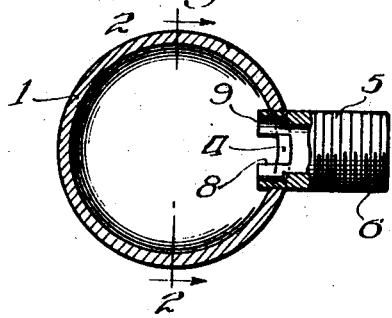
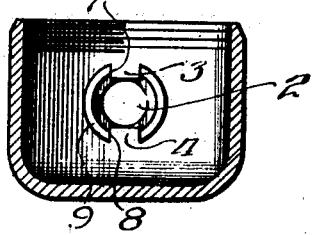
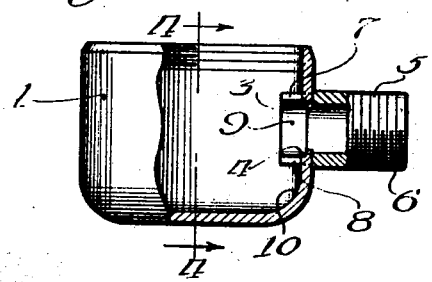
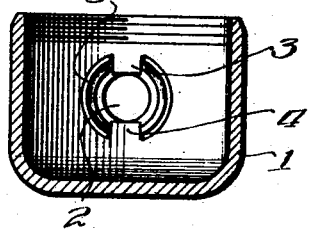
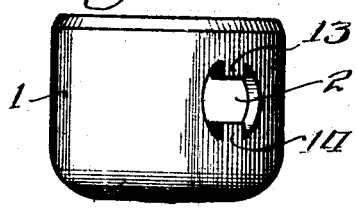
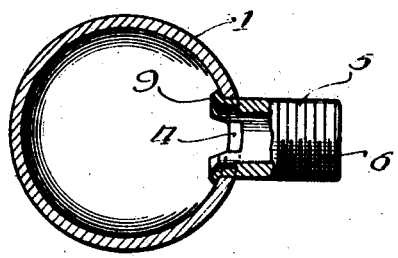
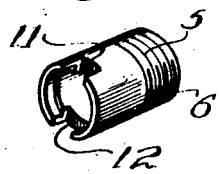
Witness
Arthur M. Framke.
Inventor.
Emil. O. H. Poeppel.
By Rummler & Rummler
Attys.

Patented Oct. 28, 1930

1,779,712

UNITED STATES PATENT OFFICE

EMIL O. H. POEPPEL, OF CHICAGO, ILLINOIS

PIPE-NIPPLE CONNECTION

Application filed November 11, 1926. Serial No. 147,718.

The main object of this invention is to provide an improved construction for attaching a pipe nipple to a thin metal body in such a manner as to definitely limit the distance which the pipe nipple enters the body and to positively prevent rotation of the nipple relative to the body.

An illustrative embodiment of this invention is shown in the accompanying drawings in which:

Figure 1 is a top plan view, partly in section, of a radiator relief valve base member or cup with the nipple in position therein.

Fig. 2 is a section taken on the line 2—2 of Fig. 1.

Fig. 3 is an elevation partly in section of the same.

Fig. 4 is a section taken on the line 4—4 of Fig. 3 with the inner protruding end of the nipple swedged out to secure the nipple to the body.

Fig. 5 is a top plan view, partly in section, of the same.

Fig. 6 is a view in perspective of the body or cup showing the aperture in the wall thereof.

Fig. 7 is a view in perspective of the pipe nipple showing the slots cut in the end thereof.

This construction is particularly adapted for use in securing a short pipe nipple to the base member or cup of a radiator relief valve wherein such valves are ordinarily secured to a radiator by grasping the valve body in the hand and screwing the nipple into a threaded aperture in the radiator, the pipe nipple being so short as to preclude the use of a Stillson wrench on the nipple.

In steam pressure heating systems where these valves are used, it is necessary that the relief valve be tightly threaded to the radiator so as to prevent leakage of steam around the pipe nipple. In relief valve constructions, where there are no squarely abutting positively locking shoulders at the point where the nipple is secured to the valve body, it has been found that when the valve body is grasped in the hand and considerable strength used to screw it tightly into the radiator, it very often happens that the nipple is broken loose from the valve body or sufficiently loosened to allow steam to escape around the connection.

In the construction shown and described herein, means are provided for positively locking the pipe nipple in the valve body in such a manner as to prevent relative rotation between the nipple and valve body and therefore great strength may be applied in the making up of the threaded joint without danger of cracking the nipple loose from the valve body or loosening the joint in such manner as to allow the escape of steam.

This is accomplished by providing the base member or cup 1 of the radiator relief valve, with an aperture 2 in the wall thereof, said aperture being of such shape that portions 3 and 4 of the body extend into the aperture forming a pair of radially disposed tongues or lugs positioned diametrically opposite each other. These tongues are of substantially the same length as the thickness of the wall of a pipe nipple 5 which is secured therein. The pipe nipple 5 is threaded on one end as shown at 6 and is provided at its other end with a pair of diametrically disposed slots 7 and 8 which are of the same width as the tongues 3 and 4. The depth of said slots being greater than the thickness of the wall of the cup 1, the end 9 of the pipe nipple protrudes beyond the inner surface of the cup wall 10 so that said end may be swaged out to retain the nipple in the cup.

The bottom walls 11 and 12 of each of said slots 7 and 8 respectively abuts against the outer surfaces 13 and 14 respectively of the tongues 3 and 4 respectively so as to positively limit and determine the distance which the nipple can enter the cup 1. The side walls of these slots bear against the adjacent side walls of their respective tongues so as to form solid square abutting shoulders which prevent rotation of the pipe nipple 5 relative to the cup 1.

The interior wall of the pipe nipple 5 is cut away at the slotted end thereof so that the protruding end 9 is comparatively thin and may be easily swaged out.

In the assembling of the parts, the slotted end of the nipple 5 is inserted in the aperture 2 until the bottom walls 11 and 12 abut against the outer surfaces 13 and 14 respectively of the tongues 3 and 4 respectively. The inner protruding end 9 of the nipple is then swaged out and the entire joint soldered.

Although but one specific embodiment of this invention has been shown and described, it is to be understood that numerous details of the construction shown may be altered or omitted without departing from the spirit of this invention as defined by the following claim:

I claim:

In a device of the class described, a body portion comprising a thin metal wall having an aperture therein, a nipple extending into said aperture having slots therein and having an internal counter-bore in advance of the ends of said slots, lugs formed on said wall substantially in the same plane therewith extending into said slots and abutting the inner extremities of the latter for preventing inward movement and rotation of said nipple relative to said body portion, and a flange formed on the inner counter-bored extremity of said nipple for preventing outward movement of the latter relative to said body portion, said flange and lugs coacting to positively clamp the body porticn and nipple together.

Signed at Chicago this 5th day of November, 1926.

EMIL O. H. POEPPEL.